United States Patent [19]

Pleibel et al.

[11] 4,274,854
[45] Jun. 23, 1981

[54] POLARIZATION-PRESERVING OPTICAL FIBER

[75] Inventors: William Pleibel, Matawan; Rogers H. Stolen, Rumson, both of N.J.

[73] Assignee: Bell Telephone Laboratories, Incorporated, Murray Hill, N.J.

[21] Appl. No.: 91,699

[22] Filed: Nov. 6, 1979

Related U.S. Application Data

[63] Continuation of Ser. No. 869,365, Jan. 13, 1978, abandoned.

[51] Int. Cl.³ .......................... C03B 37/00; C03C 25/02
[52] U.S. Cl. .............................. 65/2; 65/3 A; 65/13; 65/18; 350/96.30; 350/96.31
[58] Field of Search ............... 65/3 A, 2, 13, 18; 350/96.3, 96.31

[56] References Cited

U.S. PATENT DOCUMENTS

| | | | |
|---|---|---|---|
| 3,535,017 | 10/1970 | Miller | 350/96 |
| 3,554,721 | 1/1971 | Gardner | 65/4 B |
| 3,585,540 | 6/1971 | Scholfloffel | 333/95 |
| 3,646,472 | 2/1972 | Cooper et al. | 331/94.5 |
| 3,879,182 | 4/1975 | Strack | 65/37 |
| 3,930,714 | 1/1976 | Dyoff | 65/3 A |
| 3,932,162 | 1/1976 | Blankenship | 65/3 A |
| 4,046,537 | 9/1977 | Deserno et al. | 65/2 |
| 4,087,266 | 5/1978 | Irven et al. | 65/2 |
| 4,106,847 | 8/1978 | Arnaud | 350/96.31 |

OTHER PUBLICATIONS

Bell System Tech. Jour., "B. S. T. J. Brief-A New Optical Fiber", Kaiser et al., pp. 265-269, 2/1973.
Netherlands "Optical Waveguide For Use in Production of Non-Linear Optical Effects", No. 7510685, 3/1976.
Lens Like Medium Using a Diffused Composite-Elliptic Core Iga et al., Proceedings of IEEE 6/1975, pp. 988-989.

*Primary Examiner*—Robert L. Lindsay, Jr.
*Attorney, Agent, or Firm*—Michael B. Einschlag

[57] ABSTRACT

A method of making a polarization-preserving optical fiber is disclosed having a first step of fabricating a substrate tube to have a wall of nonuniform thickness, the nonuniformity in thickness being arranged about the wall of the substrate tube so that maxima and minima in wall thickness lie in planes which are substantially orthogonal. This first step is followed by deposition of cladding layers and a core layer within the substrate tube. The substrate is then collapsed and the fiber drawn therefrom. The nonuniform wall thickness of the substrate tube operates together with differential thermal contraction of the layers to produce stress-induced birefringence in the fiber, which birefringence provides a polarization-preserving optical fiber.

14 Claims, 5 Drawing Figures

POLARIZATION-PRESERVING OPTICAL FIBER

CROSS-REFERENCE TO RELATED APPLICATION

This application is a continuation of application Ser. No. 869,365 filed Jan. 13, 1978 now abandoned.

BACKGROUND OF THE INVENTION

Polarization-preserving optical fibers have been sought for some time because maintaining linear polarization is important for efficient coupling between single-mode fibers and polarization sensitive optical devices and for achieving maximum gains in fiber Raman and parametric oscillators and amplifiers.

It has been known in the prior art that polarization may be preserved by a fiber that has a noncircular shape and/or is birefringent. One prior art method has induced an elliptically shaped core in a fiber by collapsing a preform with a slight vacuum in the center. Another approach is illustrated by U.S. Pat. No. 3,535,017, issued to S. E. Miller on Oct. 20, 1970, in which a transmitting fiber is deformed into an asymmetric shape.

The problem addressed by the present invention is that of producing a polarization-preserving fiber resistant to the polarization-mixing effects of handling, simple to fabricate and of consistent quality.

SUMMARY OF THE INVENTION

A method of fabricating a polarization-preserving optical fiber produces a stress-induced birefringence therein. The method utilizes the novel first step of fabricating a substrate tube to have a wall of nonuniform thickness. Best results are achieved when the nonuniformity in thickness is arranged about the wall of the substrate tube so that maxima and minima in wall thickness lie in planes which are substantially orthogonal. The next steps in the method comprise depositing cladding layers and a core layer within the substrate tube, collapsing the resultant product into a preform and drawing a fiber therefrom. The surface tension in the shaped wall, which occurs during the collapsing and drawing steps, operates together with the effect of the different melting points and thermal expansion properties of the substrate tube, the cladding layers and the core to provide the stress-induced birefringence and hence the polarization-preserving properties of the resultant optical fiber.

DETAILED DESCRIPTION

Figure 1:
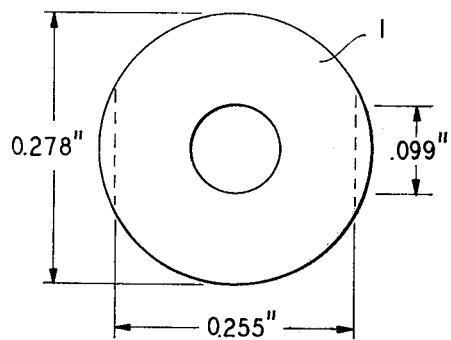
FIG. 1 shows an end view of a substrate tube used in the practice of the invention.

In FIG. 1, an end view of a quartz substrate tube 1 is shown. The outer diameter is 0.276 inches to 0.279 inches. The inner diameter is 0.099 inches. Flat surfaces were ground on the tube sides as shown, the distance between flat surfaces being 0.255 inches. The substrate tube was then mounted in an apparatus of conventional type for depositing layers of chemicals on the inside of the substrate tube. (The apparatus is basically a converted lathe, in which the substrate tube is mounted in the conventional feedstock position and a gas heater is mounted on the tool drive.) The interior of this substrate had been cleaned with commercial glass cleaner and distilled water and dried with a flow of nitrogen gas. After being placed in the apparatus, the tube was heated to 1025 degrees C. while a mixture of 250 cc/min oxygen and 750 cc/min Argon flowed through it.

An outer layer of cladding was deposited by flowing 250 cc/min of oxygen, 50 cc/min of 3 percent silane in Argon mixture, 16 cc/min of 1 percent diborane in Argon and 750 cc/min of Argon at a temperature of 985 degrees C. for 4 hours and 12 minutes. An inner layer of cladding was deposited by increasing the flow of diborane in Argon to 26 cc/min for 48 minutes while the other parameters remained as before.

A core layer was deposited by flowing 250 cc/min of oxygen, 25 cc/min of 3 percent silane in Argon and 750 cc/min of Argon at 1060 degrees C. for 27 minutes.

Figure 2:
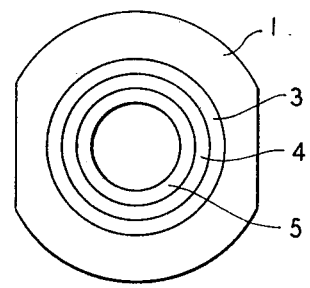
FIG. 2 shows an end view of a preform (before collapse) fabricated according to the invention.

The preform thus constructed is illustrated in FIG. 2. Substrate 1 has in its interior outer cladding layer 3, inner cladding layer 4, and core layer 5. It was then collapsed in one pass to an outer diameter of 0.0186 inches and then drawn into a fiber by conventional means. The fiber was 0.0046 inches in outer diameter.

Details of the process used to form the cladding and core layers may be found in "A New Technique for the Preparation of Low-Loss and Graded-Index Optical Fibers", J. B. MacChesney, P. B. O'Conner and H. M. Presby, *Proceedings of the I.E.E.E.*, 62, 1280 (1974) and delin "Low-Loss Optical Waveguides with Pure Fused $SiO_2$ Cores", G. W. Tasker and W. G. French, *Proceedings of the I.E.E.E.*, 62, 1281 (1974).

Figure 3:
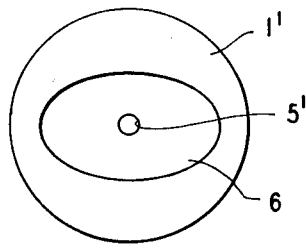
FIG. 3 shows an end view of a fiber fabricated according to the invention.

During the collapse of this preform, surface tension on the outer surface pulls the outermost surface into a circular cross section, shown in FIG. 3, in which substrate 1' exhibits a circular outer surface and a noncircular inner surface resulting from a deformation of the interior in response to the outer surface tension forces. Cladding 6 includes the material from both cladding layers 3 and 4. Its exact shape will, of course, vary with the detailed parameters of the preform. The ellipticity of cladding 6 has been exaggerated in FIG. 3 for the sake of clarity. In general, the cladding-substrate surface is definitely elliptical in cross section and the surface between core 5' and cladding 6 is circular in cross section or has a very slight degree of ellipticity. In some cases, the ellipticity of the core can differ greatly from that of the cladding. This seems to depend on the relative melting points of the core and cladding glasses. For example, a pure silica core in a borosilicate cladding will solidify while the cladding is still liquid and come out almost round. A similar fiber with a pure germania core, a borosilicate cladding and a Pyrex substrate tube has a flat, ribbon-like core. Presumably, the core ellipticity could be controlled by doping to modify its melting point.

A fiber made according to the method described above has maintained polarization over a length of 100 m. better than 100:1 (i.e., when a beam of polarized radiation was coupled into the fiber and the input end of the fiber was oriented so that the minimum amount of power was emitted from the output end in a plane at a right angle with respect to the main beam, that minimum amount was less than 1 percent of the power of the main beam).

It is believed that the polarization of transmitted radiation is preserved by a combination of asymmetric geometry and stress birefringence. In theory, both of these conditions will tend to preserve polarization and which is dominant in any case will depend on the parameters of the particular fiber in question.

In the case of the fiber discussed above, the core is circular or only slightly elliptical and the region of greatest geometric asymmetry is the cladding-substrate interface, where the electromagnetic field is weak, so that it is expected that geometric factors will be less important than stress induced birefringence. This theoretical interpretation of the invention was suggested by our colleague, V. Ramaswamy, after the invention had been reduced to practice.

The fiber is stressed because the substrate and core materials (essentially pure $SiO_2$) have a different melting point from the cladding, which is doped to alter its index of refraction. As the preform cools after it has been collapsed, the substrate cools first, establishing the elliptical cross section for the still-fluid (or soft) cladding. As the cladding cools and hardens, it is prevented by the substrate from shrinking and therefore caused to occupy a larger volume than it would if the substrate were not there, with the result that the fiber is stressed. Since the inner surface of the substrate is asymmetric, the stress is also asymmetric, giving rise to birefringence.

The relative magnitudes of geometric and stress effects will depend on the shape of the substrate tube, the relative melting points and thicknesses of the different layers and also the method of drawing the preform into a fiber. The degree to which a given fiber preserves polarization will also be dependent on the polarization-scrambling aspects of the fiber—impurities, bubbles and irregularities in the fiber dimensions, among other things, and the net result of these competing effects must be determined empirically in any particular case.

Figure 4:
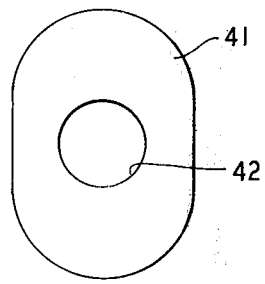
FIGS. 4 and 5 show end views of alternative shapes of substrate tube.
Figure 5:
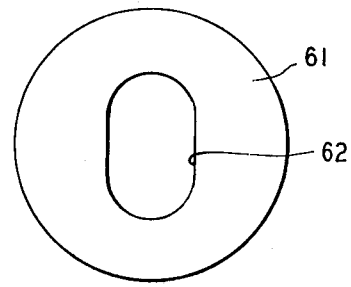

The method described above employs a grinding step to produce an asymmetric substrate. This method has the advantage of being easy to vary, but the production of a quantity of fiber would be facilitated by forming the substrate tubes with an initial noncircular cross section. The noncircularity need not be in the form of flat surfaces on the outside of this substrate, of course, and many other suitable shapes will be apparent to those skilled in the art. For example, the exterior surface 41 of the substrate may be elliptical, and the interior 42 circular, in cross section as shown in FIG. 4. Alternatively, the exterior surface 61 may be circular and the interior surface 62 may be elliptical as shown in FIG. 5. In this last case, the mechanical deformation of the interior produced by surface tension on the outer surface is lost, but the stresses produced by differential thermal contraction will remain.

All these different configurations have in common a substrate tube the thickness of whose wall is substantially nonuniform, and represents the most general description of a substrate tube that may be used to practice the invention.

The illustrative fiber described above included cladding layers having a melting point lower than the melting point of the substrate, so that the cladding layer was under tensile stress. It is also possible, of course, to employ combinations of cladding and substrate so that the substrate solidifies last and compresses both the cladding and the core.

The illustrative fiber was a "W" fiber having two cladding regions. The invention also applies to a fiber having a single cladding layer, either uniformly doped or with a radical refractive index gradient. Such a single-cladding layer fiber has been fabricated by a method that differs from that described above only in that the 1 percent diborane in Argon mixture was flowed at the rate of 20 cc/min.

The location of the stress may be controlled by varying the composition of the cladding layers. The layer with the lowest melting point will solidify last, and in the illustrated fiber the stress appears to be concentrated there. The stress, therefore, can be concentrated near the core or near the substrate, depending on the melting points of the several layers and their coefficients of thermal expansion. The net effect of the stress will also depend on the relative thicknesses at the core, cladding and substrate, of course.

We claim:

1. A method of making an optical fiber comprising the steps of:
    fabricating a substrate tube having a wall with an outer surface and an inner surface of predetermined shape, the distance between said outer surface and said inner surface being the thickness of said wall,
    depositing at least one cladding layer on the interior of said substrate tube by a vapor deposition process,
    depositing a core layer on the interior of said at least one cladding layer by a vapor deposition process,
    radially collapsing said substrate tube by a heating process to form an optical preform, and
    drawing an optical fiber from said preform,
    characterized in that said step of fabricating causes the thickness of the wall of said substrate tube to be substantially nonuniform in thickness, said nonuniformity in thickness being arranged about said wall so that maxima and minima of said thickness lie in planes which are substantially orthogonal, whereby said steps of collapsing said substrate tube and drawing an optical fiber from said preform form a polarization-preserving optical fiber.

2. A method of making an optical fiber according to claim 1, wherein said step of fabricating is further characterized in that at least one of said outer and inner surfaces is noncircular in cross section.

3. A method of making an optical fiber according to claim 2, wherein said step of fabricating is further characterized in that the other one of said outer and inner surfaces is substantially circular in cross section.

4. A method of making an optical fiber according to claim 3, wherein said step of fabricating is further characterized in that said outer surface is substantially noncircular in cross section and said inner surface is substantially circular in cross section.

5. A method of making an optical fiber according to claim 4, wherein said step of fabricating is further characterized in that said cross section of said wall is formed by shaping said outer surface of said wall, said outer surface initially having a substantially circular cross section.

6. A method of making an optical fiber according to claim 5, wherein said step of shaping is further characterized in that said step of shaping comprises grinding said outer surface.

7. A method of making an optical fiber according to claim 1, wherein said step of depositing at least one cladding layer is further characterized in that a plurality of cladding layers are deposited and the one of said plurality of cladding layers having the lowest melting point is located in a predetermined relationship to said core layer to concentrate a stress in a predetermined location between said substrate tube and said core layer.

8. A method of making an optical fiber according to claim 7, wherein said step of fabricating is further characterized in that at least one of said outer and inner surfaces is noncircular in cross section.

9. A method of making an optical fiber according to claim 8, wherein said step of fabricating is further characterized in that the other one of said outer and inner surfaces is substantially circular in cross section.

10. A method of making an optical fiber according to claim 9, wherein said step of fabricating is further characterized in that said outer surface is substantially noncircular in cross section and said inner surface is substantially circular in cross section.

11. A method of making an optical fiber according to claim 10, wherein said step of fabricating is further characterized in that said cross section of said wall is formed by shaping said outer surface of said wall, said outer surface initially having a substantially circular cross section.

12. A method of making an optical fiber according to claim 11, wherein said step of shaping is further characterized in that said step of shaping comprises grinding said outer surface.

13. A method of making a polarization-preserving optical fiber from a substrate tube having a wall with an outer surface comprising the steps of:
shaping said wall of said substrate tube to be substantially nonuniform in thickness, said nonuniformity in thickness being arranged about said wall so that maxima and minima of said thickness be in planes which are substantially orthogonal;
depositing at least one cladding layer on the interior or said substrate tube by a vapor deposition process;
depositing a core layer on the interior of said cladding layers by a vapor deposition process;
radially collapsing said substrate tube by a heating process to form an optical preform; and
drawing an optical fiber from said preform.

14. A method of making an optical fiber comprising the steps of:
fabricating a substrate tube having a wall with an outer surface and an inner surface of predetermined shape, the distance between said outer surface and said inner surface being the thickness of said wall,
depositing at least one cladding layer on the interior of said substrate tube by a vapor deposition process,
depositing a core layer on the interior of said at least one cladding layer by a vapor deposition process,
radially collapsing said substrate tube by a heating process to form an optical preform, and
drawing an optical fiber from said preform, characterized in that said step of fabricating causes the thickness of the wall of said substrate tube to be substantially nonuniform in thickness, said nonuniformity in thickness being asymmetrically arranged about said wall, whereby said steps of collapsing said substrate tube and drawing an optical fiber from said preform form a polarization-preserving optical fiber.

* * * * *